United States Patent
Mortensen

(10) Patent No.: US 8,484,631 B2
(45) Date of Patent: Jul. 9, 2013

(54) SUPPORTING HARDWARE CONFIGURATION CHANGES IN A UEFI FIRMWARE COMPONENT

(75) Inventor: James L. Mortensen, Lynnwood, WA (US)

(73) Assignee: Phoenix Technologies Ltd., Milpitas, CA (US)

( * ) Notice: Subject to any disclaimer, the term of this patent is extended or adjusted under 35 U.S.C. 154(b) by 261 days.

(21) Appl. No.: 13/076,225

(22) Filed: Mar. 30, 2011

(65) Prior Publication Data

US 2012/0254831 A1      Oct. 4, 2012

(51) Int. Cl.
G06F 9/44 (2006.01)
(52) U.S. Cl.
USPC .......................... 717/162; 717/164; 717/107
(58) Field of Classification Search
None
See application file for complete search history.

(56) References Cited

U.S. PATENT DOCUMENTS

| | | | |
|---|---|---|---|
| 6,487,713 B1 * | 11/2002 | Cohen et al. | 717/105 |
| 7,774,774 B1 * | 8/2010 | Mulligan et al. | 717/174 |
| 2005/0283599 A1 * | 12/2005 | Zimmerman et al. | 713/2 |
| 2006/0224876 A1 * | 10/2006 | Kato | 713/1 |
| 2007/0050762 A1 * | 3/2007 | Chen et al. | 717/169 |
| 2009/0319747 A1 * | 12/2009 | Jibbe et al. | 711/170 |
| 2010/0011197 A1 | 1/2010 | Harmer | |
| 2010/0262962 A1 * | 10/2010 | Chaganti | 717/174 |
| 2010/0318779 A1 | 12/2010 | Jones | |
| 2010/0318961 A1 * | 12/2010 | Khoruzhenko et al. | 717/107 |
| 2010/0318962 A1 | 12/2010 | Jones | |
| 2011/0078293 A1 | 3/2011 | Phung et al. | |
| 2011/0271268 A1 * | 11/2011 | Dang | 717/168 |
| 2012/0124567 A1 * | 5/2012 | Landry | 717/168 |

* cited by examiner

*Primary Examiner* — Insun Kang
(74) *Attorney, Agent, or Firm* — Christopher J. Brokaw; Brokaw Patent Law PC

(57) ABSTRACT

A method and apparatus for providing support for customization of a build configuration of a Unified Extensible Firmware Interface (UEFI) compatible component. The method includes modifying the build configuration of the UEFI compatible component to reflect modifications to a first file. A configuration parameter is received. The configuration parameter is used to create a configuration parameter symbol pointing to the first file. The first file is replaced with a second file, which includes modifications to the first file. The modifications support a functionality desired by a user.

9 Claims, 5 Drawing Sheets

SUPPORTING HARDWARE CONFIGURATION CHANGES IN A UEFI FIRMWARE COMPONENT

FIELD OF THE INVENTION

The disclosure herein relates to providing support for configuring hardware components in a unified extensible firmware interface (UEFI) firmware component.

BACKGROUND

The Unified Extensible Firmware Interface Forum (the "UEFI Forum") is an alliance between several leading technology companies to modernize the booting process by use of a new protocol, the Unified Extensible Firmware Interface (UEFI) protocol. The UEFI Forum has published several versions of the UEFI protocol, the latest being version 2.3 on May 9, 2009.

Many microchip manufactures provide their customers with Customer Reference Boards (CRBs) as platforms to allow their customers to evaluate microchips (or "chips") supplied by the chip manufacturer (also referred to as a "silicon vendor" or SV) for their specific applications. These manufacturer-provided platforms may include other hardware, software, or embedded firmware components, some of which may be tailored to a particular application of the customer. Customers of the microchip manufacturer are entitled to install the platform on one or more systems/devices (e.g., servers, personal computers, etc.) in order to evaluate the chip for their application. The embedded firmware in CRBs (also known as platform firmware) may include one or more Unified Extensible Firmware Interface (UEFI) component, each performing as a programming interface between the operating system (OS) of the system and the embedded firmware of the platform. The UEFI component also performs the function of platform initialization.

The Platform Initialization Working Group (PIWG) of the UEFI Forum provides specifications that are intended to promote interoperability between firmware components provided by various entities, such as silicon vendors and firmware vendors. These specifications provide a common internal framework for developers of hardware components and platform drivers.

A challenge of using UEFI arises from the large amount of effort required to perform customization of UEFI builds to suit the requirements of Original Equipment Manufacturers (OEMs) and others. Such customization includes revising a firmware product from a first device design to a related or derived design; for example, a board laid-out by the OEM that may incorporate hardware changes with respect to a CRB produced by a Silicon Vendor (SV).

Specifically, customizing source code in UEFI drivers which provide support for hardware components is a challenging task. Prior solutions build UEFI drivers into binary components from a collection of source code files. A utility (such as a ProcessDsc utility) parses a build script file (which may have a .dsc file extension and be referred to as a DSC file) to determine the list of drivers to be built as part of the binary build process. The DSC file contains an entry for each UEFI driver that should be built. This entry defines the path to a file with the .inf file extension (called an INF file). The INF file is one file among a collection of source code and header files that comprise the driver. The INF file contains, among other things, the list of source code files to be built in order to create the driver as a binary component. Typically, code that would need to access a hardware component, such as an Embedded Controller (EC), is written directly into the source code of each file where the support is needed. However, writing the hardware support code directly into the source code may create customization difficulties. In particular, customization difficulty may arise when a customer board uses a different hardware component than was used in the original CRB. Various approaches to address this difficulty have been proposed, each approach having certain drawbacks. Therefore, there is the need for a simpler manner of customizing source code in UEFI drivers.

BRIEF DESCRIPTION OF THE DRAWINGS

Embodiments of the present embodiments are described herein by way of example, and not by way of limitation, in the figures of the accompanying drawings and in which like reference numerals refer to similar elements, as follows.

DETAILED DESCRIPTION

Figure 1:
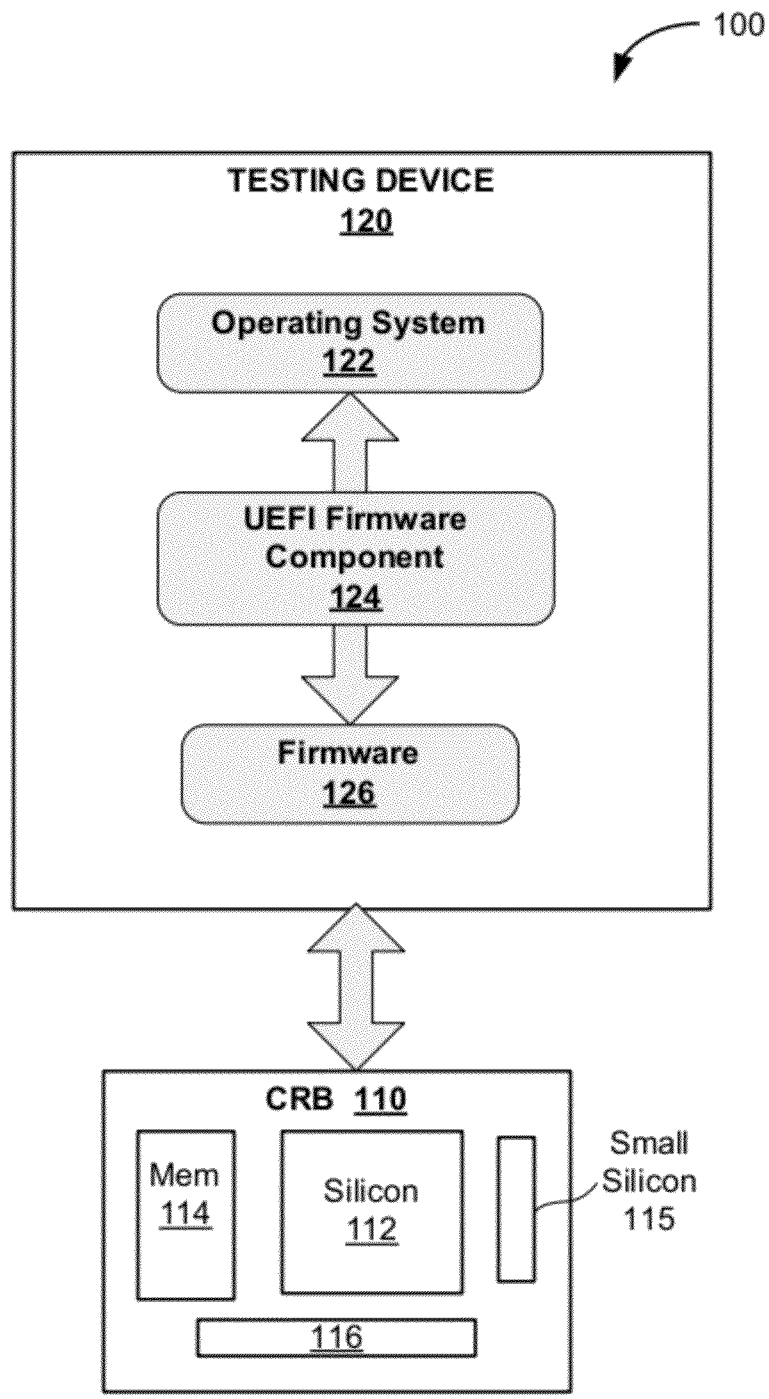
FIG. 1 is a block diagram of an evaluation system using customization of a build configuration in accordance with some embodiments.

Approaches for providing support for customization of a build configuration of a UEFI component are disclosed. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known components are shown in block diagram form to avoid obscuring the present disclosure.

A method in accordance with the present embodiments includes customizing of a build configuration of a Unified Extensible Firmware Interface (UEFI) compatible component. The build configuration of the UEFI compatible component is modified to reflect modifications to a first file. A configuration parameter is received from the user. The configuration parameter is used to create a configuration parameter symbol pointing to the first file. The first file is replaced with a second file, which includes modifications to the first file. The modifications support a functionality desired by a user.

Embodiments described herein simplifies the customization efforts of users by providing support for customization of a build configuration by the users, for example, when using a Unified Extensible Firmware Interface (UEFI) source code written for an original CRB. Users may include customers of a Silicon Vendor (SV), such as Original Device Manufacturers (ODMS) or Original Equipment Manufacturers (OEMs)

(herein, both referred to as "customers"). The customers may use the UEFI source code as a basis to support their design, which is based on the original CRB, but may differ from it substantially or trivially. For example, there may be hardware changes that are substantial in scope, but nonetheless, relatively limited in variety.

These changes may include hardware port configuration for connection to external electronic devices and/or the use of memory of differing operational modes, types, sizes, performance, and so on, as compared with that on the CRB. In other situations, Input-Output (I/O) routing, Interrupt Request (IRQ) and Advanced Programmable Interrupt Controller (APIC) Routing may be selected to suit local needs. Sometimes, the OEM board may use the same complex semiconductor chip (herein referred to as "Silicon") but entirely different small silicon, from that on the CRB. The Silicon may comprise a chipset, for example, a core logic chipset including a graphic and memory controller chip (e.g., a Northbridge chip) and an I/O controller chip (e.g., a Southbridge chip). Small silicon may include, non-complex silicon components, such as a Super I/O device, an Embedded Controller (EC), and so on.

In some embodiments, the support for customization of the build configuration by the customers, as described herein, may be provided for changes corresponding to small silicon. The embodiments can utilize available build parameters from other sources to define a file path pointing to a file, which contains the source code that provides support for accessing small silicon features. The embodiments provide an easy method for customers to replace the default small silicon support source code with a custom code that supports the small silicon included in their customized customer board.

In some embodiments, the build configuration may be used to build a UEFI compatible program for driving a silicon component, such as small silicon. The first file may provide support for accessing features of the silicon component. A configuration parameter symbol may be included in a definition language file of a platform module that supports the silicon component. The configuration parameter symbol may comprise a path to a file which includes the driver name and the silicon component. The first file (i.e., default file) may include a source code file containing a set of default functions required by the platform module. The driver may call any of the functions of the set of functions to access the silicon component features. When building the driver into a binary component, the configuration parameter symbol may be used instead of the source code file name in the information (INF) file. The second file includes modifications in the first file according to changes in the silicon component features and overrides all of the default functions, as the second file will be used in the build instead of the first file.

FIG. 1 is a block diagram of an evaluation system 100 using customization of a build configuration in accordance with some embodiments. Evaluation system 100 includes a testing device 120 and a customer reference board (CRB) 110. In some embodiments, testing device 120 may comprise, inter alia, a Personal Computer (PC), a laptop, or any other device usable to test or evaluate a silicon chip (e.g., silicon chip 112) supplied by a hardware component supplier.

Testing device 120 includes an operating system (OS) 122, firmware 126, and a UEFI compatible firmware component 124. Operating system 122 may comprise a set of related programs that control operations of testing device 120 and allocation of various resources (not shown in FIG. 1, for simplicity) to a host of applications on testing device 120.

Firmware 126 may include programs/data structures that control internal/external devices (such as CRB 110), typically at low levels. Firmware 126 may reside in Programmable Logic Array (PLA), ROM, or flash memory. UEFI firmware component 124 functions as a programming interface between OS 122 and firmware 126 of testing device 120 and/or the embedded firmware of the platforms such as CRB 110.

In some embodiments, CRB 110 may be installed in an interface slot of testing device 120 or otherwise be coupled to testing device 120, via an external interface, for example, a Universal Serial Bus (USB). In an embodiment, CRB 110 may include silicon chip 112, memory 114, and hardware 116 as depicted in FIG. 1. Silicon chip 112 may comprise or correspond to a silicon chip that is provided by the hardware component supplier for evaluation via use in CRB 110. A customer of hardware component supplier may wish to evaluate silicon chip 112 using evaluation system 110 to ensure that silicon chip 112 is suitable for the customer's needs, e.g., silicon chip 112 may need to perform in a specified manner to be suitable for use in an application of the customer. Memory 114 may include non-volatile memory such as Read Only Memory (ROM) or flash memory to include software/firmware programs to support functions performed by CRB 110. Hardware 116 may include or correspond to various logics/circuits to provide support such as power and communication interfaces for silicon chip 112 to be able to communicate with testing device 120. Small silicon 115 may comprise non-complex silicon components, such as a Super I/O device, an Embedded Controller (EC), and so on.

The present embodiments simplify customization of source codes that are used in UEFI firmware component 124 for providing support for small silicon components, such as small silicon 115.

Figure 2:
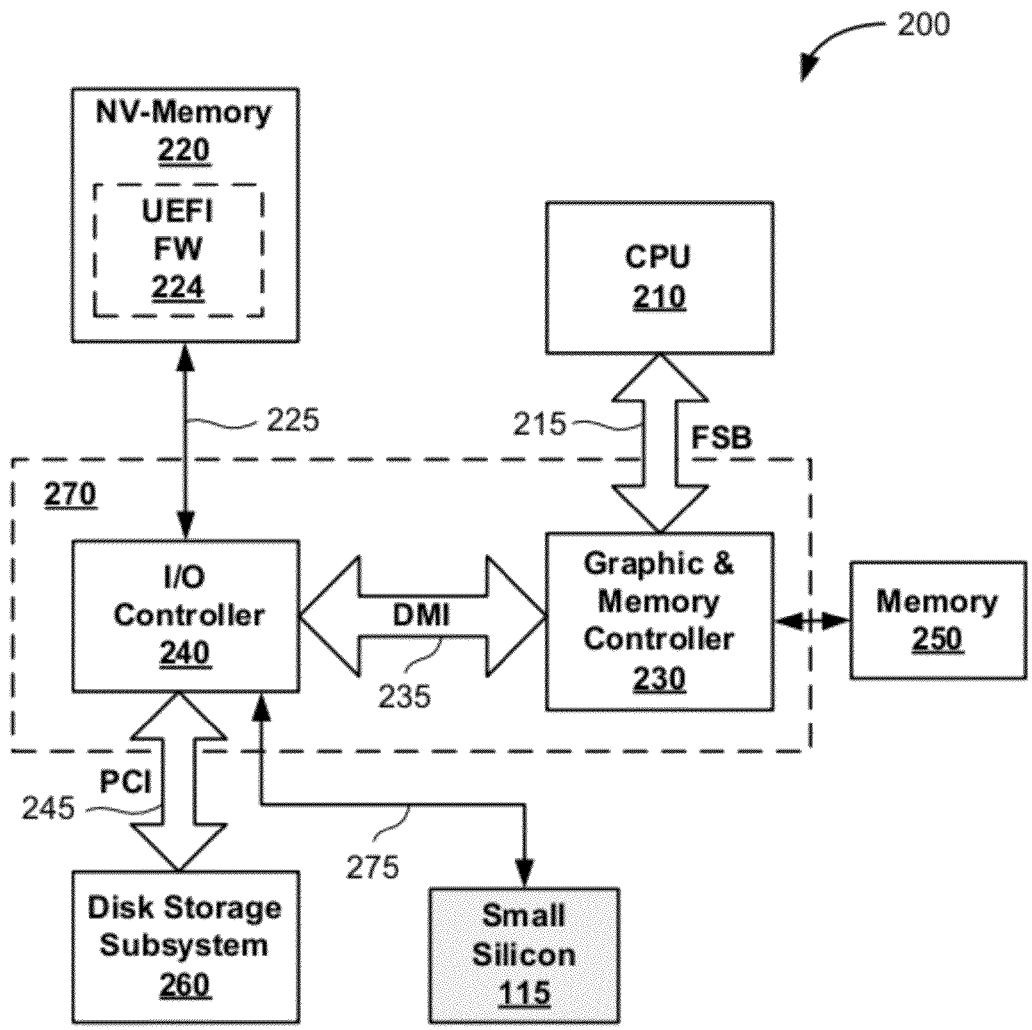
FIG. 2 is a block diagram of a system configured as a target system for customizing a build configuration in accordance with some embodiments.

FIG. 2 is a block diagram of a system 200 configured as a target system for customizing a build configuration in accordance with some embodiments of the invention. System 200 includes a Central Processing Unit (CPU) 210, a Non-Volatile (NV) memory 220, a memory 250, a chipset 270, a disk storage subsystem 260, and small silicon 115 (such as a Super I/O device, or an EC). CPU 210 operates in conjunction with chipset 270. CPU 210 may comprise more than one processor and performs, inter alia, arithmetic and logical operations necessary for the operation of system 200. System 200 may comprise or correspond to testing device 120 of FIG. 1 or any other computer, which is operative to provide an EFI/UEFI firmware environment 224 stored in NV-memory 220. UEFI firmware environment 224 may in turn provide a Driver Execution Environment (DXE) interface protocol and/or a Boot Device Selection (BDS) phase interface. DXE and BDS are well known in the UEFI arts.

Chipset 270 may include a graphic and memory controller 230, such as the known Northbridge chip, and an I/O controller 240, such as the known Southbridge chip. Graphic and memory controller 230 is coupled to CPU 210 by a Front Side Bus (FSB) 215, and typically provides an interface between CPU 210 and the remainder of system 200. Graphic and memory controller 230 also provides an interface to memory 250 and, possibly, to other devices, such as an on-board graphics adapter (not shown in FIG. 2). Memory 250 may comprise the main memory of system 200, and may include Random Access Memory (RAM), Dynamic RAM (DRAM), and the like.

I/O controller 240 is coupled to graphic and memory controller 230 by a Direct Media Interface (DMI) 235. I/O controller 240 may be responsible for controlling many of the input/output functions of system 200, such as Universal Serial Bus (USB), sound adapters, Ethernet controllers, and one or more General Purpose Input/Output (GPIO) port (not shown in FIG. 2). A bus may comprise a Peripheral Component Interconnect (PCI) bus circuit 245, to which a disk storage subsystem 260 (hereinafter "disk 260") or other storage devices for storing an operating system and application programs may be attached. I/O controller 240 may also provide a peripheral interface 275 to couple small silicon 115. I/O controller 240 may also incorporate a timer circuit for generating timer circuit interrupts, typically at periodic intervals.

OS 122 of FIG. 1, which typically includes a set of programs that control operations of system 200 and allocation of various resources, may be stored on disk 260. One or more application programs may run on top of (i.e., be loaded and directed by) OS 122 and use computer resources made available through OS 122 to perform application specific tasks desired by a user of system 200. Disk 260 may also provide non-volatile storage for system 200. Although the description of computer-readable media contained herein refers to a mass storage device, such as a hard disk or Compact-Disc-ROM (CD-ROM) drive, it should be appreciated by those skilled in the art that computer-readable media can be any available media that can be accessed by system 200.

By way of example, and not limitation, computer-readable media may comprise computer storage media and communication media. Computer storage media includes volatile and non-volatile, removable and non-removable media implemented in a method or technology for storage of information, such as computer-readable instructions, data structures, program modules or other data. Computer storage media includes, but is not limited to, RAM, ROM, Erasable Programmable ROM (EPROM), Electrically EPROM (EEPROM), serial EEPROM, Flash memory or other solid state memory technology, CD-ROM, Digital Versatile Disk (DVD), or other optical storage, magnetic cassettes, magnetic tape, magnetic disk storage or other magnetic storage devices well-known in the art, or any other medium which can be used to store the desired information and which can be accessed by the computer.

A peripheral interface 225 may connect NV-memory 220 to I/O controller 240. NV-memory 220 may include ROM or, more typically, a Non-Volatile Random Access Memory (NVRAM), such as flash memory, for storing UEFI platform firmware 224. The UEFI platform firmware 224, which is with the UEFI Specification, includes program code containing the basic routines that help in starting up system 200 and transferring information between elements within system 200.

System 200 may comprise any type of computing devices, including embedded computer systems, PCs, laptops, handheld computers such as tablets, Personal Digital Assistants (PDAs), and the like. System 200 may not include all of the components shown in FIG. 2, instead, it may include other components that are not explicitly shown in FIG. 2, or may utilize a different architecture from that shown in FIG. 2.

In some embodiments, the UEFI platform firmware 224 includes a driver for a silicon component (e.g., small silicon 115) in CRB 110. The driver for the small silicon may be included in a silicon module, which may provide UEFI compatible programs for driving the silicon component. A platform module including one or more UEFI compatible program may provide platform services to programs in the silicon module. The platform services may comprise a Pre-EFI module to Pre-EFI module Interface (PPI) and a Driver Execution Environment (DXE) interface for being used by the programs in the silicon module.

Small silicon 115 is often replaced on customer boards by different hardware components. Therefore, the original source code that provides proper support for CRB 110 of FIG. 1 must be modified to properly support the customer board. Current strategies for customization of small silicon support code may not be flexible when dealing with new versions of small silicon that may provide additional or different feature sets. As new versions of small silicon 115 become available for use by future chipset concept CRBs, previous libraries, protocols, and PPIs must be modified to provide functions to access these new feature.

For example, when a customization method of conditionalizing small silicon support code is used, the code that provides the support is simply either included or excluded during the build process. As a result, this method only supports disabling the original code, but does not provide a mechanism to easily add custom code. If the original small silicon component is removed without replacement from a customer board, this solution successfully disables the code that is no longer needed. However, if a customer board uses a different small silicon component from what was used on the original CRB, the original small silicon support source code must be modified to provide support for the newer small silicon. This can involve extensive work, since the original small silicon support code must be located and modified in all source files within all build components, which are often in many different functions, in many different files across many different drivers. Other customization solutions suffer from a variety of shortcomings, such as not being easily extensible, being prone to bugs, not allowing for easy deprecation, requiring external software components, and so on.

The present embodiments address the disadvantages described above, and provide an easy customization method for small silicon support code. The specific support required by small silicon is defined at a driver level with a default set of functions that provide the support, and can be overridden using configuration build parameters (hereinafter "configuration parameter"), as described with respect to FIGS. 3A through 3C and 4 below.

Figure 3A:
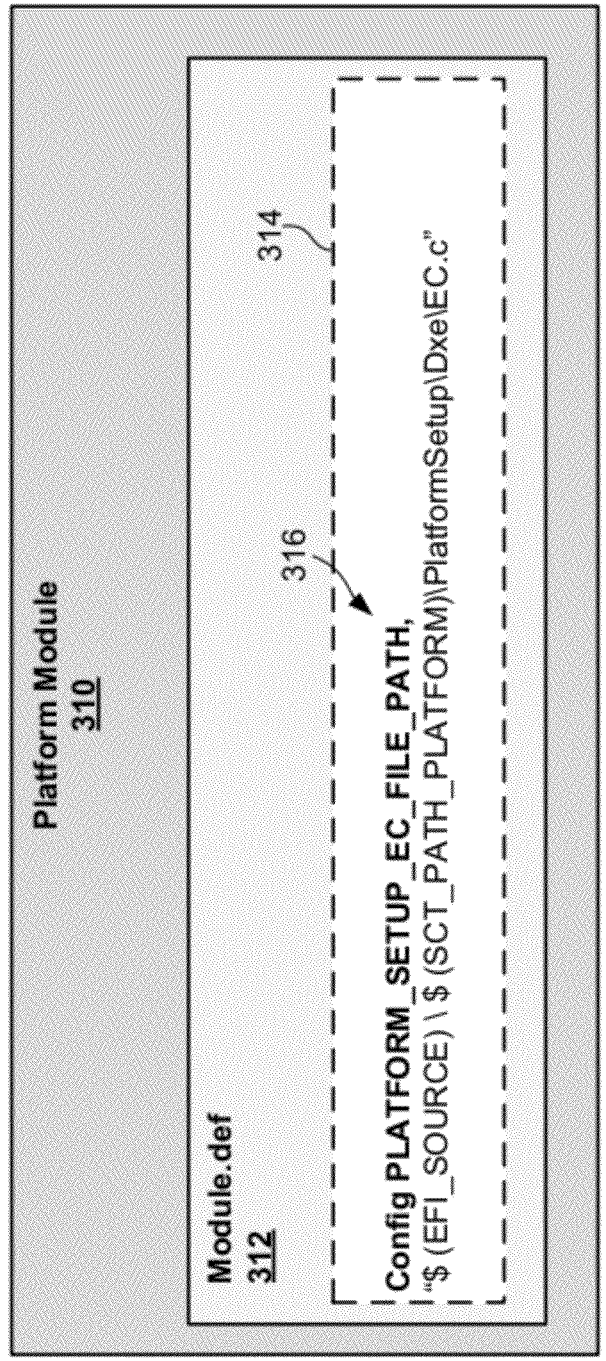
FIG. 3A depicts a platform module including a definition file defining a configuration parameter symbol in accordance with some embodiments.

FIG. 3A depicts a platform module 310 including a module definition file 312 defining a configuration parameter symbol 316 in accordance with some embodiments. The present embodiments support customization of a build configuration by creation of a configuration parameter. In embodiments, the configuration parameter is defined by the platform module with a default value. The default value is the path to the default file in the platform driver (see FIG. 3A). The customer can override the configuration parameter to change it to a path to a custom file in another location (e.g., a board module). The configuration parameter is used to create a configuration parameter symbol, which defines a path to a first file that provides the actual small silicon support code. Each component that needs the first file then specifies the configuration parameter symbol in its Information (INF) file. The component may, for example, be a driver that uses small silicon support.

For instance, a driver named PlatformSetup that uses small silicon (such as an Embedded Controller (EC)) support may have a symbol definition 314 including a configuration parameter symbol 316. Symbol definition 314 is included in the module definition (module.def) file 312 of the platform module 310. With this example, the default set of functions that provide the support required by PlatformSetup to access the EC are defined in the Ec.c file (i.e., the first file) located in the Dxe directory within the PlatformSetup driver's directory, as shown in symbol definition 314. All EC specific codes are implemented in the Ec.c file.

Figure 3B:
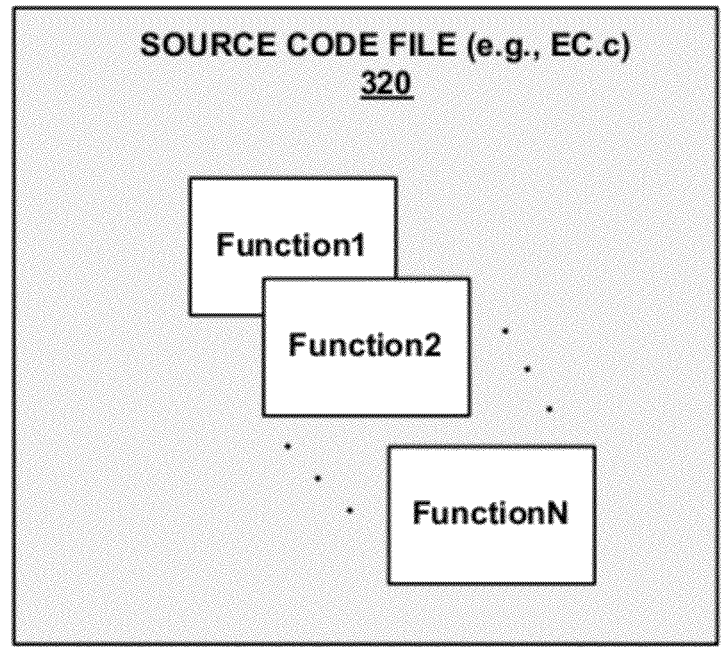
FIG. 3B depicts a structure of a source code file in accordance with some embodiments.

FIG. 3B depicts a structure of a source code file 320 in accordance with some embodiments. The first file (e.g., the EC.c file of FIG. 3A) may comprise source code file 320, which includes a set of N default functions (Function1-FunctionN) that provide the exact support required by the component (e.g., the driver, such as the PlatformSetup driver). PlatformSetup driver functions do not contain small silicon specific code (e.g., EC specific code). Instead all small silicon specific codes are implemented in the EC.c file, which contains a set of APIs that are called by the PlatformSetup driver functions to perform the small silicon specific work.

Figure 3C:
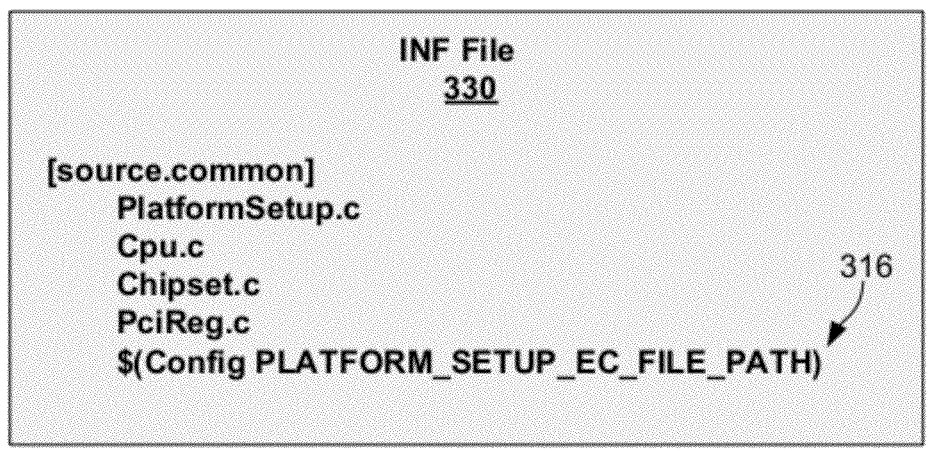
FIG. 3C depicts an Information (INF) file including the configuration parameter symbol of FIG. 3A in accordance with some embodiments.

FIG. 3C depicts an Information (INF) file 330 including the configuration parameter symbol 316 in accordance with some embodiments. To provide easy customization when building the driver (e.g., PlatformSetup) into a binary component, instead of using the actual file name (e.g., EC.c) in INF file 330 to specify the source code file to be included in the driver build, configuration parameter symbol 316 is used, as shown in the last line of INF file 330.

One benefit of the present embodiment is that the support files (e.g., EC.c) are small and focused on actual needs. Each driver (e.g., PlatformSetup) that requires support for a specific small silicon component (e.g., EC) defines its own configuration parameter used in the INF file 330 to include the source code file that provides that support. Therefore, these small silicon support files can be focused to include only the support functions required by the driver. This keeps the small silicon support files small and easy to write, because only a small subset of the small silicon's available features needs to be implemented and made available through the default support functions (included in source code file 320). Therefore, unneeded feature-support functions are not implemented in the INF is file 330. As a result, all paths in the small silicon support files can be more easily tested to reduce bugs through exercising of all functions in source code file 320 of FIG. 3B.

Typically, a customer board may contain a different small silicon component from the one on the CRB 110 of FIG. 1, and may need to override the source code (e.g., the first file, such as EC.c) that provides access to the physical hardware component (e.g., EC). With the present embodiments, the default small silicon support file is included in the build configuration, using a configuration parameter. Therefore, to override the first file (e.g., a default file) and replace it with a modified second file, the customer simply redefines the configuration parameter in a project definition (Project.def) file. The project definition file has a parametric build capability, so that each driver specified in the build configuration may have compile-time configuration parameters that may be specified in the build configuration, thus promoting customer control over various policies that may be embodied in each driver.

Because the entire path to the first file (e.g., small silicon support file) is defined by the configuration parameter, the first file can be copied to any location of customer's choice and modified or be replaced by a second file including some modifications to the first file. This allows the customer to place small silicon support files in project-specific folders making them specific to some projects, or place them in a common directory for use by many projects. Because each driver specifies its own configuration parameter to define the small silicon support file, the customer could choose to use the same small silicon support source file to support several different drivers by simply implementing all functions required by both drivers in a single small silicon support source file, or could use the same source file to support several different projects that all share the same small silicon on different boards.

Moreover, as the code that provides the small silicon support is built as part of the driver itself, there is no need for external components in addition to the driver. This reduces complexity because full-featured libraries and drivers are not required in order to provide support for all possible features. Because external drivers that implement small silicon Application Programming Interfaces (APIs) are not required, the complications required to properly synchronize dispatching of drivers is not a concern. In addition, future designs that require additional support simply extend the set of functions to include the additional support, and obsolete features can simply be removed from the file in newer version of small silicon.

Figure 4:
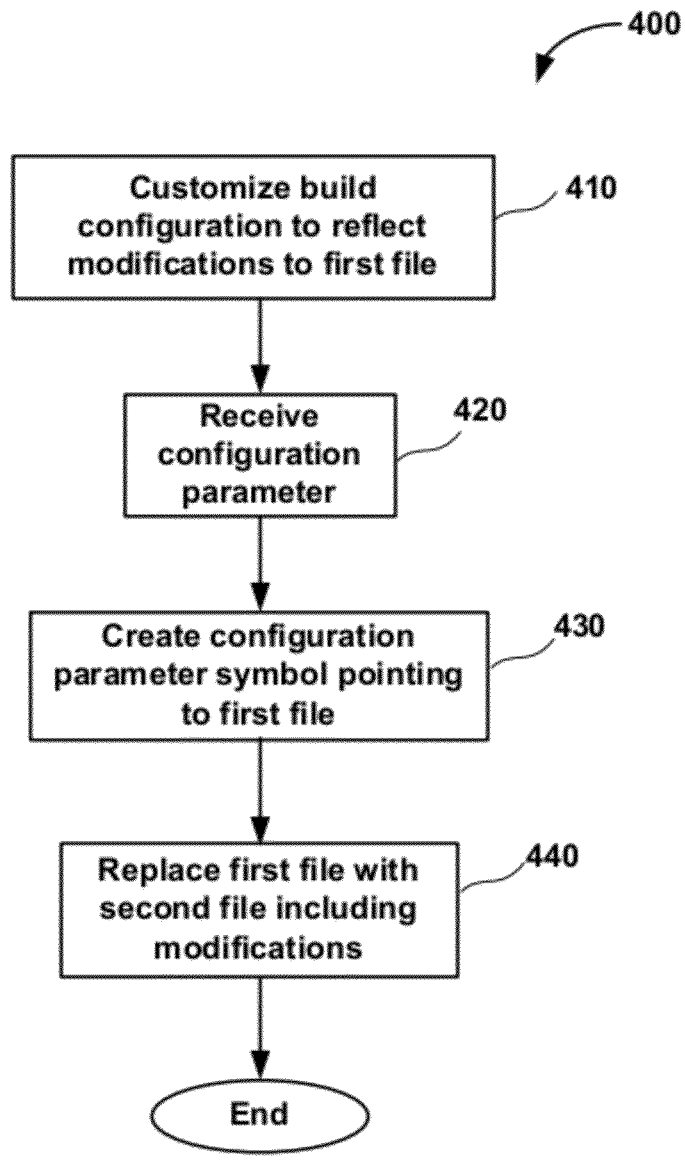
FIG. 4 is a flow diagram of a method for customizing a build configuration in accordance with some embodiments.

FIG. 4 is a flow diagram of a method 400 for customizing a build configuration in accordance with some embodiments. Method 400 starts by customizing a build configuration by modifying the build configuration to reflect modifications to a first file (e.g. small silicon support file, such as Ec.c) (410). A configuration parameter may be received from a customer (420). Next, using the configuration parameter, a configuration parameter symbol 316 of FIG. 3A is created, which points to the first file (430). The first file may be replaced with a second file (e.g., a modified first file), which includes modifications to the first file. The modifications may support a functionality desired by the customer, as discussed above with respect to FIG. 3C (440).

One or more embodiments described herein provide that methods, techniques, and actions performed by a computing device are performed programmatically, or as a computer-implemented method. Programmatically means through the use of code or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium, such as disk 260 of FIG. 2. Numerous machines, such as system 200 of FIG. 2, may provide examples of processing resources and computer-readable mediums, on which instructions for implementing present embodiments can be carried and/or executed. In particular, the numerous machines include processor(s) and various forms of memory for holding data and instructions. Computers, terminals, network enabled devices (e.g. mobile devices, such as cell phones) are all examples of machines and devices that utilize processors, memory, and instructions stored on computer-readable mediums. Additionally, embodiments may be implemented in the form of computer-programs or a computer usable carrier medium capable of carrying such a program.

While the present embodiments have been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A method for customizing a build configuration of a Unified Extensible Firmware Interface (UEFI) compatible component, comprising:
   modifying the build configuration of a UEFI compatible driver of a silicon component to reflect modifications to a set of default functions for the driver by a processor:
      creating, using a configuration parameter, a configuration parameter symbol identifying a path to a first file, wherein the first file is a first source code file containing the set of default functions for the silicon component; and
      replacing, using the configuration parameter symbol, the first file with a second file for the driver, wherein the second file is a second source code file that comprises modifications to the first file for the driver, wherein the modifications support custom functionality for the driver,
      wherein the second file comprises only those functions used by the driver, and wherein the second file does not comprise any functions involving features of the silicon component which are not used by the driver.

2. The method of claim 1, further comprising including the configuration parameter symbol in a definition language file of a platform module that supports the silicon component.

3. The method of claim 1, wherein the path identified by the configuration parameter symbol includes the driver name and the silicon component.

4. The method of claim 1, further comprising calling the set of default functions by the driver to access silicon component features.

5. The method of claim 1, further comprising using the configuration parameter symbol instead of the source code file name in the information (INF) file when building the driver into a binary component.

6. The method of claim 1, wherein the silicon component comprises small silicon included in a customer reference board (CRB).

7. A system for providing support for customization of a build configuration of a Unified Extensible Firmware Interface (UEFI) compatible component, comprising:
   one or more processors; and
   memory having instructions encoded therein, the instructions when executed by the one or more processors perform a method including:
      modifying the build configuration of a UEFI compatible component driver of a silicon component to reflect modifications to a set of default functions for the driver by performing:
         creating, using a configuration parameter, a configuration parameter symbol identifying a path to a first file,
         wherein the first file is a first source code file containing the set of default functions for the silicon component; and
         replacing, using the configuration parameter symbol, the first file with a second file for the driver, wherein the second file is a second source code file that comprises modifications to the first file for the driver, wherein the modifications support custom functionality for the driver,
         wherein the second file comprises only those functions used by the driver, and wherein the second file does not comprise any functions involving features of the silicon component which are not used by the driver.

8. The system of claim 7, wherein the method further comprises including the configuration parameter symbol in a definition language file of a platform module that supports the silicon component.

9. A non-transitory computer-readable medium having instructions encoded therein, the instructions when executed by one or more processors perform a method comprising:
   modifying a build configuration of a Unified Extensible Firmware Interface (UEFI) compatible driver of a silicon component to reflect modifications to a set of default functions for the driver by performing:
      creating, using a configuration parameter, a configuration parameter symbol identifying a path to a first file, and
      wherein the first file is a first source code file containing the set of default functions for the driver; and
      replacing, using the configuration parameter symbol, the first file with a second file for the driver, wherein the second file is a second source code file that comprises modifications to the first file for the diver, wherein the modifications support custom functionality for the driver,
      wherein the second file comprises only those functions used by the driver, and wherein the second file does not comprise any functions involving features of the silicon component which are not used by the driver.

* * * * *